Aug. 4, 1931.  R. HENRY ET AL  1,817,438
SPRING CONNECTION
Filed Oct. 20, 1926  2 Sheets-Sheet 2
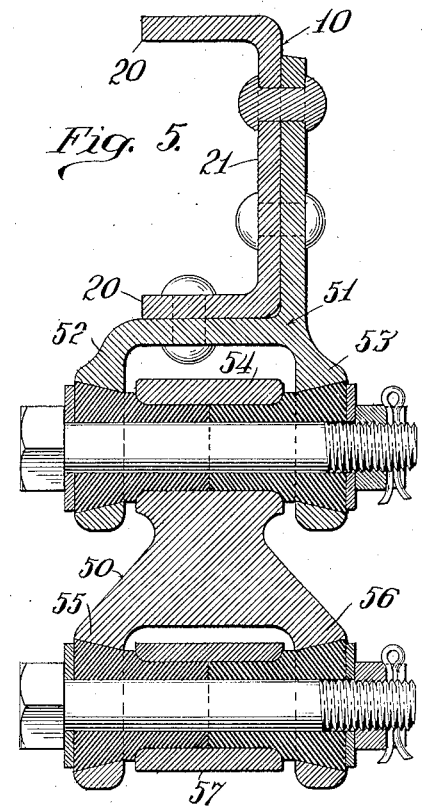
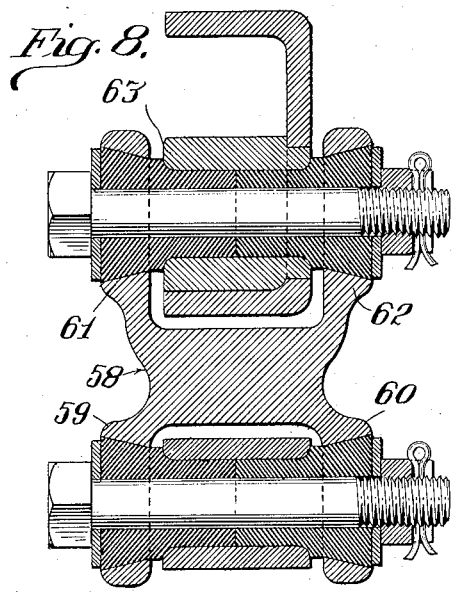
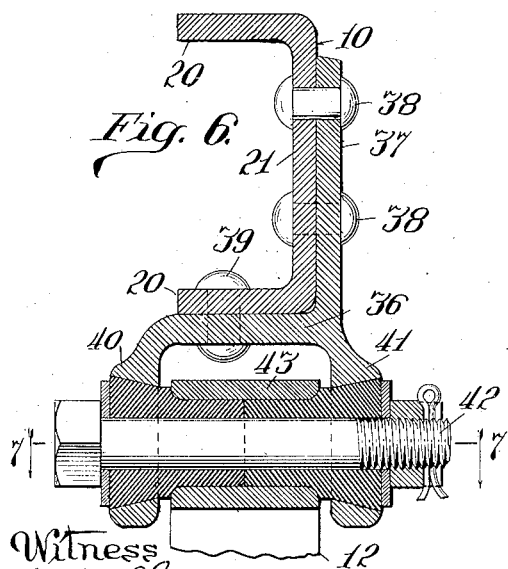
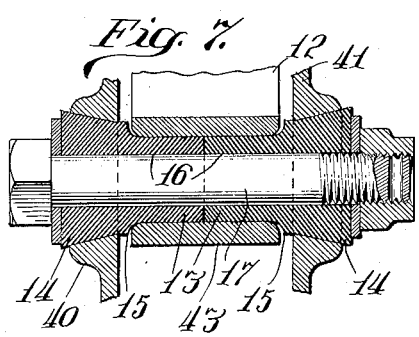
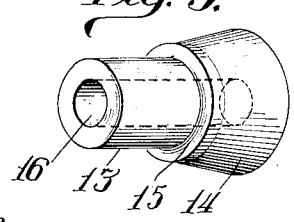

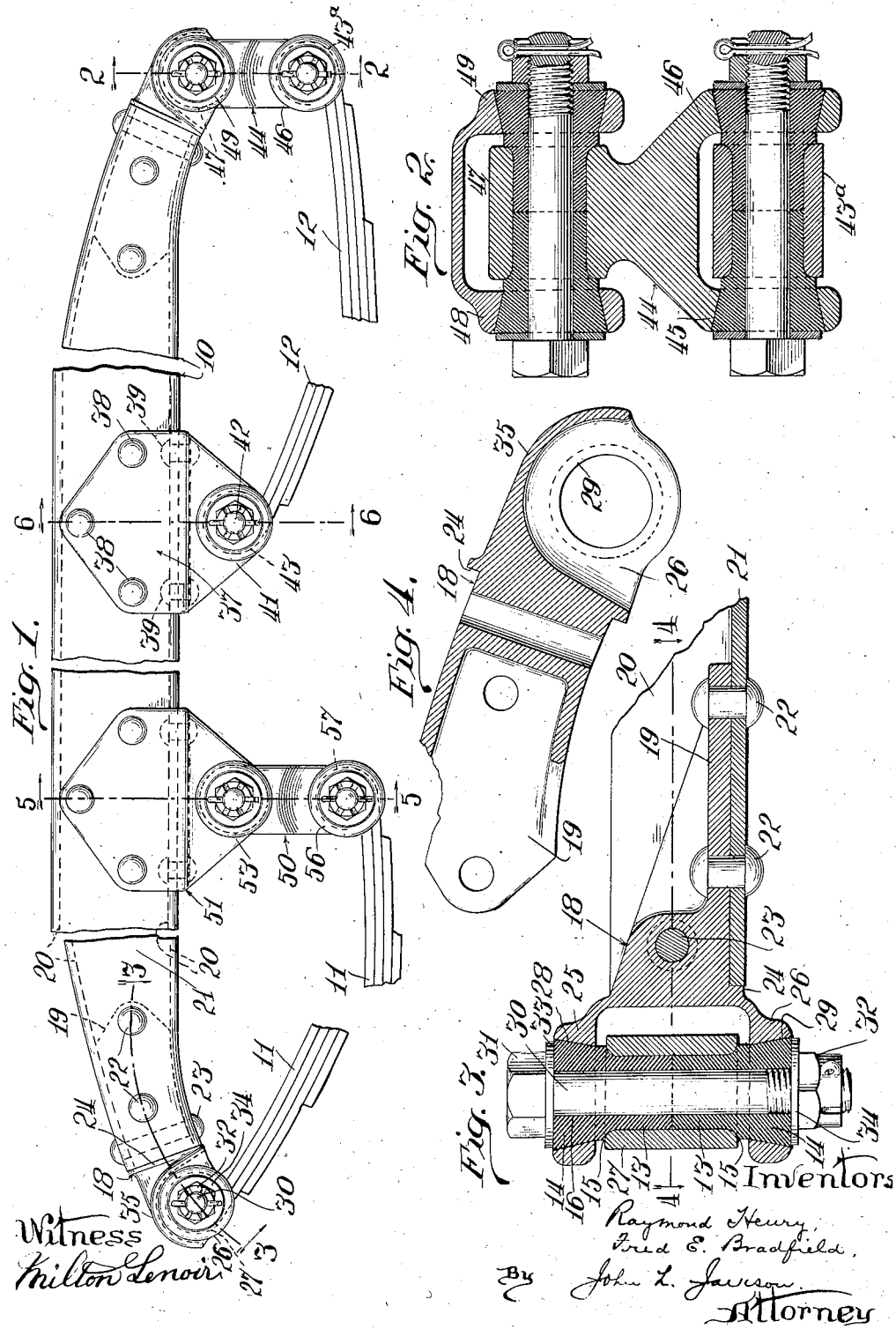

Patented Aug. 4, 1931

1,817,438

UNITED STATES PATENT OFFICE

RAYMOND HENRY, OF ROCK ISLAND, ILLINOIS, AND FRED E. BRADFIELD, OF DAVENPORT, IOWA, ASSIGNORS, BY MESNE ASSIGNMENTS, TO O-N SPRING SHACKLE COMPANY, OF DAVENPORT, IOWA, A CORPORATION OF IOWA

SPRING CONNECTION

Application filed October 20, 1926. Serial No. 142,859.

Our invention relates to oscillating joint connections, such for example as spring shackles, and it has to do particularly with oilless connections of the general character set forth in the pending applications of Raymond Henry, filed July 17, 1925, Serial No. 44,231, and filed January 15, 1926, Serial No. 81,384, said latter application being patented on November 27, 1928, No. 1,692,837. One of the characteristic features of such connections is the use of a bushing, composed of elastic material, comprising a tubular body portion adapted to fit into the eye of a spring or other part to which it may be applied, and capable of being radially expanded within the spring eye into tight engagement with its inner surface. Preferably the bushing is made in two duplicate parts, each having a head at its outer end, and the expansion of the body portions thereof is effected by means of a bolt that passes through the bushing members and serves to draw them together while their heads are confined against outward expansion radially. The constructions shown in said Henry applications are designed more particularly for use in connection with separate spring shackles or links mounted upon the outer end portions of the bolt and fitting over the outer surfaces of the heads of the bushings so that endwise pressure is applied to said heads by drawing the links closer together.

The object of our present invention is to provide an improved spring connection by which the advantages realized by the use of such expansible bushings may be obtained without using separate shackle links, as in many situations the use of such links is impractical or undesirable, and also to improve the contruction of spring connections of this type in other respects that will be hereinafter pointed out. We accomplish this object as illustrated in the accompanying drawings and hereinafter described. What we regard as new is set forth in the claims.

Our invention finds its greatest field of utility as a connection for vehicle springs, particularly those of motor vehicles, and, therefore, in the accompanying drawings we have illustrated it as applied to the front and rear springs of an automobile, but it should be understood that our improvements may be applied to any other use for which they are adapted, and the claims hereinafter made are therefore to be construed accordingly.

In the accompanying drawings,—

Fig. 1 is a side elevation of the frame of the chassis of an automobile, some parts being broken away to permit of illustration on a larger scale of the parts in which our invention is incorporated;

Fig. 2 is a vertical cross section on line 2—2 of Fig. 1;

Fig. 3 is a sectional view taken on the curved line 3—3 of Fig. 1;

Fig. 4 is a longitudinal vertical section of the bracket connection for the front end of the front spring, taken on line 4—4 of Fig. 3;

Fig. 5 is a vertical cross section on line 5—5 of Fig. 1;

Fig. 6 is a vertical cross section on line 6—6 of Fig. 1;

Fig. 7 is a section on the line 7—7 of Fig. 6, illustrating the bushings before they are compressed;

Fig. 8 is a vertical sectional view illustrating a modified arrangement for connecting the rear end of the front spring with the frame; and Fig. 9 is a perspective view of one of the bushings.

Referring to the drawings, 10 indicates one of the side members of an automobile frame, 11 one of the usual front springs, and 12 one of the rear springs. The front end of each front spring is usually pivotally connected directly to the front end of the automobile frame by providing it with a cylindrical bearing in the form of an eye which is carried on a bolt that passes through openings in the front end of the frame, the rear end of the front spring being connected to the frame by a pair of links and bolts that constitute a shackle connection. In the case of the rear springs a similar arrangement is usually employed, the front end of each rear spring being pivotally connected directly with the frame while its rear end is connected with the rear end of the frame by shackle links. In all cases, according to the present practice, the connecting bolts constitute pivots on which the parts bear and turn, which arrangement involves a number of metal to metal bearing surfaces, all of which must be kept well lubricated, particularly as they are subject to accumulation of dust, which is apt to cause wear. If the parts become dry they squeak more or less, and when the shackles wear they rattle. To prevent too rapid deterioration of the connections it has heretofore been found necessary to use hardened bolts, and to machine or face the inner and outer surfaces of the castings in which the bolts are fitted, all of which increases manufacturing costs.

While the constructions shown and described in said Henry applications avoid the objectionable characteristics of such metal to metal bearing connections, the particular constructions shown in said applications involve the use of links that may be drawn together, and are not conveniently applicable in certain situations, as for example, where direct connection without the use of separate links is desired. Our present invention provides a construction by which a bushing embodying the Henry invention may be applied either to a direct connection, or to one comprising a shackle that may be in the form of a single link. We also make practicable the use of malleable castings and common bolts in forming our improved spring connections, thereby materially reducing the cost of manufacture.

In carrying out our invention we make use of bushings composed of elastic material, such as rubber, and each comprising a tubular body portion having a substantially frusto conical head at one end thereof, the conical surface of the head being so disposed that it tapers toward the body portion. This construction is best shown in Fig. 9, in which 13 indicates the tubular body portion and 14 the frusto conical head. At the point of juncture between the body portion and head a shoulder 15 is formed. The bushing is provided with an axial bore 16 for the passage of a bolt 17, (Fig. 7) and as clearly shown in the drawings a pair of these bushings, oppositely disposed, are employed in connection with each bolt. The conical heads 14 of the bushings are adapted to fit in axially alined tapered openings formed in the arms of a yoke that constiutes an attaching device of one form or another, depending upon the particular spring connection that is to be made. For example, Fig. 3 illustrates a form of yoke designed for connecting the front end of the spring to the frame of the vehicle, and in that case the yoke is in the form of a bracket 18 comprising a plate 19 that is adapted to fit into the channel at the front end of the side frame, such channel comprising side flanges 20 and an intermediate wall or plate 21 against which the plate 19 fits and to which it is secured by rivets 22. The bracket 18 may be further secured by a rivet 23 that passes through it and the side flanges 20, as shown in said figure. It is also preferably provided with a shoulder 24 that abuts against the front end of the side frame 10. Forward of the side frame the bracket 18 carries parallel arms 25, 26, spaced apart a somewhat greater distance than the width of the spring eye, which is indicated by 27, the arrangement being such that said spring eye is adapted to fit into the yoke formed by the bracket 18 and the arms 25, 26. The oppositely tapered openings in the arms 25, 26 are indicated by 28, 29. As shown in Figs. 1 and 3, the arms 25, 26 of the connecting member or yoke lie in parallel vertical planes, and the bushings are fitted into the openings therein from the outside, so that the heads 14 lie in the tapered openings 28, 29 while their body portions 13 extend into the eye 27 from its opposite ends and fit closely therein. The shoulders 15 bear against the end margins of the eye 27 and center it between the two arms 25, 26. The length of the body portions 13 of the bushings is such that when they are in place their inner ends abut, and it will be apparent that by drawing the two bushings together, by applying endwise pressure thereto in opposite directions, the body portions of the bushings will be caused to expand within the eye, and tightly engage its inner surface, their heads will be expanded into tight engagement with the inclined faces of the connecting member. This is accomplished by means of a bolt 30 which passes through the two bushings and is provided at one end with a head 31 that bears against the outer surface of one of the bushings and with a nut 32 that bears against the outer surface of the other bushing. (See Fig. 3.) Washers 33, 34, are preferably interposed between the head and nut respectively and the bushings against which they bear, said washers being of slightly less diameter than the diameter of said bushings at their outer ends. Therefore, by screwing the nut 32 upon the bolt the bushings may be drawn together and expanded not only into tight engagement with the inner surface of the spring eye 27, but also into tight engagement with the outer surface of the bolt. This also binds the spring eye tightly between the shoulders 15 so that it is held against movement longitudinally of the bolt. Under ordinary strains the spring eye does not turn relatively to the outer surface of the bushings since their elasticity allows such pivotal movement of the spring about the bolt as may be necessary, and it is only under extraordinary strains that any movement of the eye upon the bushings will occur. There is, therefore, no wear to speak of between the parts, and as there are no bearing surfaces lubrication is unnecessary. Furthermore, the bushings fit so tightly that it is practically impossible for dust to creep into the connection, so that wear on that account is avoided. The bracket 18 may be a malleable casting, and no machining is necessary because smooth bearing surfaces are not required. Even if there should be slight irregularities in the openings 28, 29 the heads 14 of the bushings readily adapt themselves to them, and there is no engagement between the ends of the spring eye and the inner faces of the arms 25, 26, so that facing of such surfaces is not necessary. Preferably a curved web 35 unites the arms 25, 26 at the top and extends over the upper part of the spring eye 27, as shown in Figs. 1 and 4, to re-enforce said arms, protect the spring eye, and present a neater appearance.

The construction shown in Fig. 3 is one that is designed particularly for use in connecting the front end of a front spring directly with the front end of the frame. A somewhat similar arrangement is used for connecting the front end of the rear spring with the frame, although in the latter case the spring is not connected in line with the frame, but rather is connected to a bracket that depends from it. The arrangement for that purpose is best shown in Figs. 1 and 6. It comprises a yoke in the form of a bracket 36 adapted to fit against the under side of the lower flange 20 of the frame and having an upwardly extending plate 37 that fits against the outer surface of the intermediate portion 21 of the frame bar, to which it is secured by rivets 38. A rivet 39 also secures the bracket 36 to the lower flange 20. Said bracket is provided with arms 40, 41 like the arms 25, 26 in function,—that is to say, they support a pair of bushings adapted to be compressed by a bolt 42 within the front eye 43 of the rear spring 12.

Where it is desirable to connect the spring with the frame by means of a shackle or swinging connection the constructions shown more particularly in Figs. 2, 5 and 8 may be employed. The arrangement shown in Fig. 2 is intended for the rear end of a rear spring, and it comprises a yoke in the form of a link 44 having arms 45, 46 at its lower end that correspond in function with the arms 25, 26, and support the rear eye 43ª of the rear spring. The upper end of the link 44 is in the form of a sleeve 47 which fits between the arms 48, 49 of a yoke formed on or secured to the rear end of the frame bar of the vehicle. In the illustrated construction this yoke is shown in dotted lines in Fig. 1 as being a bracket similar to the bracket 18. In the arrangement shown in Fig. 2 the sleeve 47 is mounted on the elastic bushings in the same manner that the spring eyes are mounted thereon, and the bushings cooperate with it in a similar manner. The link 44 is free to swing fore and aft in the same manner that an ordinary spring shackle swings except that there is ordinarily no relative movement between the inner surface of the sleeve and the outer surfaces of the bushing. What has been said with respect to the action of the spring eye applies also to the sleeve 47.

The rear end of the front spring is mounted similarly to the rear end of the rear spring in that we provide a shackle 50 similar to the shackle 44, but instead of mounting it immediately on the side bar of the frame it is connected with said frame by a bracket 51 which is also in the form of a yoke that corresponds in arrangement and design with the bracket 36 used for connecting the front end of the rear spring with the frame. This will be clear from an inspection of Fig. 5 in which the bracket 51 is shown as being provided with arms 52, 53 that form a yoke to support a pair of bushings that fit into a sleeve 54 carried at the upper end of the shackle or link 50. At its lower end said link is provided with arms 55, 56 that support a pair of bushings which fit into the eye 57 at the rear end of the front spring 11.

In some instances it may be desired to use a shackle or link in the form of a double yoke, and in Fig. 8 we have shown an arrangement of that kind, which is designed for use in connecting the rear end of the front spring with the frame, although the same form of double yoke may also be used for connecting the rear end of the rear spring with the frame. In the arrangement shown in Fig. 8 a link 58 is provided having downwardly extending arms 59, 60 corresponding to the two arms 25, 26. It is also provided with upwardly extending arms 61, 62 that perform a similar function in that they support a pair of bushings in the same way. The arms 61, 62 constituting the upper yoke are spaced far enough apart to receive the frame bar between them, and a sleeve 63 is fitted on the body portions of the bushings and is fixedly secured to the frame bar in any suitable way, so that it provides a cylindrical bearing for the bushings in substantially the same way as a spring eye or as the sleeves 47, 54. If a double yoke were applied to the rear end of the rear spring the eye usually provided at the rear end of each frame bar would fit upon the body portions of the bushings, in which case the sleeve 63 would not be needed. The double yoke construction is well suited for use in applying our improved bushings to existing automobiles, in practically all of which there is a sleeve or eye on the frame bar, which, according to present practice, receives the bolt by which the upper ends of the usual shackle links are connected to the frame bars.

It will be seen from the foregoing description that in all the several designs illustrated the bushings are supported by a connecting member comprising arms a fixed distance apart, preferably in the form of a yoke, which in some cases is secured directly or immovably to the frame bars, whereas in other cases it has a swinging or movable connection therewith. Also that the bushings center the spring eye, or the link or shackle member, and avoid the necessity of lubricating the parts.

What we claim as our invention and desire to secure by Letters Patent, is—

1. A connection of the type described comprising a member having a cylindrical bearing, a bolt extending through said bearing, a bushing interposed between said bolt and said bearing consisting of an elastic tubular member adapted to be expanded into tight engagement with the surface of the bolt and the inner face of the bearing, one end of said tubular member comprising an enlarged head portion, and means co-acting with said bolt to so expand said tubular member, said means comprising arms a fixed distance apart mounted on the end portions of the bolt, the enlarged head portion of said tubular member engaging in an opening in one of said arms.

2. A connection of the type described comprising a member having a cylindrical bearing, a connecting member having arms a fixed distance apart and provided with alined openings, a bolt extending through said openings and said bearing and rotatable relatively to said openings, and a bushing interposed between said bolt and said bearing, consisting of an elastic tubular member expanded into tight engagement with the connecting member, the surface of the bolt and the inner face of the bearing.

3. A connection of the type described comprising a member having a cylindrical bearing, a connecting member having arms a fixed distance apart and provided with alined openings, a bolt extending through said openings and said bearing and rotatable relatively to both, and a bushing interposed between said bolt, the bearing and said openings, said bushing consisting of an elastic tubular member compressed between said connecting member, the bolt and the inner surface of the bearing.

4. A connection of the type described comprising a member having a cylindrical bearing, a connecting member having arms a fixed distance apart and provided with alined openings, a bolt extending through said openings and said bearing and capable of axial oscillation relatively to said arms, and a bushing interposed between said bolt, the bearing and said openings, said bushing consisting of an elastic tubular member compressed between said connecting member, the bolt and the inner and end surfaces of the bearing.

5. A connection of the type described comprising a member having a cylindrical bearing, a bolt extending through said bearing, and a bushing interposed between the bolt and the bearing, consisting of two elastic tubular members extending into the opposite end portions of said bearing and abutting against each other, the outer ends of said tubular members having enlarged head portions, and means co-acting with the bolt to compress said tubular members endwise and thereby expand them radially into tight engagement with the inner face of the bearing and the surface of the bolt, said means comprising arms a fixed distance apart mounted upon the end portions of the bolt, said enlarged head portions having angular surfaces engaging in openings in said arms.

6. A connection of the type described comprising a member having a cylindrical bearing, a bolt extending through said bearing, an elastic tubular bushing interposed between said bolt and said bearing, said bushing having a substantially frusto-conical head at its outer end, and means co-acting with said bolt to press the bushing tightly between the bolt and the bearing, said means comprising arms a fixed distance apart mounted on the end portions of the bolt.

7. A connection of the type described comprising a member having a cylindrical bearing, a bolt extending through said bearing, an elastic tubular bushing interposed between said bolt and said bearing, said bushing having a body portion with a substantially frusto-conical head tapering toward one end of said body portion, and means co-acting with said bolt to expand said body portion radially comprising a connecting member having an opening tapered to receive said head.

8. A connection of the type described comprising a member having a cylindrical bearing, a two-part bushing composed of elastic tubular members fitted in the opposite end portions of said bearing with their inner ends abutting against each other, said bushing members having inwardly tapered substantially frusto-conical heads at their outer ends, a bolt extending through the bushing members, and a connecting member in the form of a yoke having arms in fixed relation to each other and provided with tapered openings to receive said heads, whereby said bushing members may be expanded radially within said bearing by means of said bolt.

9. A connection of the type described comprising a member having a cylindrical bearing, a two-part bushing composed of elastic tubular members and having body portions fitted in the opposite end portions of said bearing with their inner ends abutting against each other, said bushing members having inwardly tapered substantially frusto-conical heads at their outer ends, and shoulders abutting against the end portions of said bearing, a bolt extending through the bushing members, and a connecting member in the form of a yoke having arms fixed relatively to each other and provided with conical openings in their outer faces to receive said heads.

10. A spring connection comprising a yoke having axially alined openings spaced apart and provided with inwardly converging tapered surfaces, oppositely disposed elastic bushings having substantially frusto-conical heads fitted in said openings and tubular body portions extending inwardly from said heads, a cylindrical bearing mounted upon said body portions, and a bolt extending through said bushings for drawing them together.

11. A spring connection comprising a yoke having axially alined openings spaced apart and provided with inwardly converging tapered surfaces, oppositely disposed elastic bushings having substantially frusto-conical heads fitted in said openings, tubular body portions extending inwardly from said heads and shoulders at the juncture between said heads and said body portions, a cylindrical bearing member mounted on said body portions between said shoulders, and a bolt extending through said bushings for drawing them together.

12. A spring connection for vehicles comprising a yoke carried by the vehicle frame and having axially alined openings spaced apart and provided with inwardly converging tapered surfaces, oppositely disposed elastic bushings having substantially frusto-conical heads fitted in said openings and tubular body portions extending inwardly from said heads, a cylindrical bearing member fitted on said body portions, and a bolt extending though said bushings for drawing them together.

13. A spring connection for vehicles comprising a yoke carried by the vehicle frame and having axially alined openings spaced apart and provided with inwardly converging tapered surfaces, oppositely disposed elastic bushings having substantially frusto-conicl heads fitted in said openings and tubular body portions extending inwardly from said heads, a link having a cylindrical bearing at one end fitted on said body portions, the other end of said link being arranged for the attachment of a spring eye thereto, and a bolt extending through said bushings for drawings them together.

14. A bushing composed of elastic material and comprising a tubular body portion having a substantially frusto-conical head at one end thereof, the conical surface of said head tapering toward said body portion.

15. A bushing composed of elastic material and comprising a tubular body portion having a substantially frusto-conical head at one end thereof, the conical surface of said head tapering toward said body portion and forming a shoulder at its juncture therewith.

16. A connection of the type described comprising a member having a cylindrical bearing, a bolt extending through said bearing, a two-part bushing composed of elastic tubular members fitted in the opposite end portions of said bearing with their inner ends abutting against each other, said bushing members having inwardly tapered substantially frusto-conical heads at their outer ends, and means coacting with said bolt to expand said bushings radially comprising connecting means having openings tapered to receive said heads.

17. A connection of the type described comprising a member having a bearing, a bolt extending through said bearing, a bushing interposed between said bolt and said bearing consisting of an elastic tubular member adapted to be expanded into tight engagement with the surface of the bolt and the inner face of the bearing, two arms a fixed distance apart mounted on the end portions of the bolt said bolt and arms being relatively rotatable, and means operable from the outer side of one of said arms to so expand said tubular member.

18. A connection of the type described comprising a member having a substantially cylindrical bearing, a two-part bushing composed of elastic tubular members having body portions fitted in the opposite end portions of said bearing with their inner ends abutting against each other, said bushing members havng substantially frusto-conical heads at their outer ends, a bolt extending through the bushing members, two arms maintained a fixed distance apart mounted on said bolt and provided with conical openings to receive said heads, and means operable from the outer side of one of said arms to expand said bushing members radially within said bearing.

19. A spring connection for vehicles comprising a yoke carried by the vehicle frame and having axially aligned openings spaced apart, oppositely disposed elastic bushings having enlarged heads fitted in said openings and tubular body portions extending inwardly from said heads, a link having a cylindrical bearing at one end fitted on said body portions, a bolt exending through said bushings for drawing them together, said link having a yoke formed at its other end, a spring eye disposed between the arms of said latter yoke, a bolt extending through said spring eye and arms, and an elastic bushing interposed between said latter bolt and said spring eye.

20. A connection of the type described comprising two members adapted to have relative oscillatory movement in the operation of the connection, said members having alined bearing openings therein, a connecting pintle extending ito the openings of both members, elastic bushing means engaging between said pintle and each of said openings, and means for compressing said bushing means, said elastic bushing means completely resiliently insulating said pintle from said members, whereby relative movement between said members occurs partly as flexure of the bushing material between one of said members and said pintle and partly as flexure of the bushing material between said pintle and the other of said members.

21. A connection of the type described comprising two members adapted to have relative movement in the operation of the connection, said members having openings therein, a connecting pintle extending into said openings, and elastic bushing means engaging between said pintle and each of said openings, whereby relative movement between said members occurs partly as flexure of the bushing material between one of said members and said pintle and partly as flexure of the bushing material between said pintle and the other of said members.

RAYMOND HENRY.
FRED E. BRADFIELD.